Oct. 15, 1935.  P. K. WILLIAMS  2,017,427
BOTTLE HOLDER
Filed Sept. 2, 1930

Inventor
PHILIP K. WILLIAMS

By W. Clay Lindsey.
Attorney

Patented Oct. 15, 1935

2,017,427

UNITED STATES PATENT OFFICE 2,017,427

BOTTLE HOLDER

Philip K. Williams, Glastonbury, Conn., assignor to The J. B. Williams Company, Glastonbury, Conn., a corporation of Connecticut Application September 2, 1930, Serial No. 479,207

1 Claim. (Cl. 215—12)

This invention relates generally to bottle casings or holders, and involves a novel type of casing which is designed primarily for use in protecting bottles containing toilet materials. The invention has in view, as its principal object, the provision of a metallic casing or holder for preventing damage to or breakage of bottles, and which includes novel means for creating an interlock between the casing and the bottle, whereby the two are maintained in assembled relation. In accordance with this invention, I propose to provide a depression in the bottle, and after the latter has been inserted in the casing, the metal of the casing is deformed so as to provide a deformed portion thereof which enters into the depression of the bottle, thereby setting up the desired interlock which maintains the assembled relation.

A more detailed feature of the invention resides in the provision, at appropriate places, of weakened portions in the casing so as to facilitate the deformation of the metal, I propose to form the bottle with a substantially rectangular depression, and to slit the casing along the lines corresponding to the parallel sides of the depression. With this arrangement, the metal between the slits is readily pressed into the depression of the bottle, whereby the permanency of the assembled relation between the two is insured.

Other objects will be in part obvious, and in part pointed out more in detail hereinafter.

The invention accordingly consists in the features of construction, combination of elements and arrangement of parts which will be exemplified in the construction hereinafter set forth and the scope of the application of which will be indicated in the appended claim.

For a full and more complete understanding of the invention, reference may be had to the following description and accompanying drawing, wherein.

Figure 1:
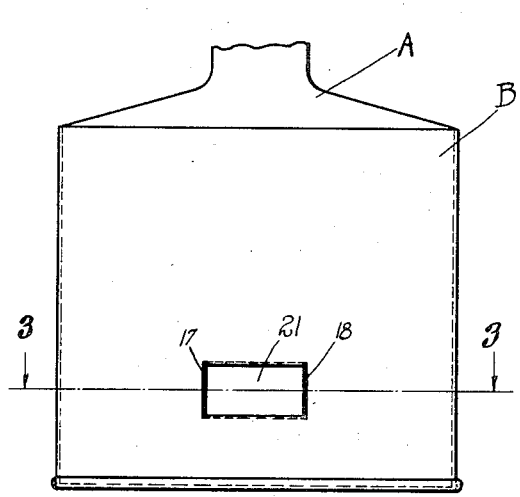
Figure 1 is a view in side elevation of a bottle contained in a casing in accordance with the precepts of this invention.

Referring now to the drawing, a bottle is shown at A as being of a well-known shape, which is commonly employed to contain such toilet materials as an after-shaving lotion for men. In this connection, it is notable that the invention is not to be limited with respect to the particular shape or size of the bottle. Any bottle of the shape permitting of its insertion in the casing is susceptible of being held in a casing to constitute an embodiment of this invention.

The casing or holder, in which the bottle A is inserted, is shown at B as being of a shape conforming with that of the bottle A. This casing B comprises flat side walls 10, 11, 12, and 13, the upper edges of which define the opening at the top of the casing through which the bottle A is inserted. The casing B also includes a bottom wall designated 14, which may be connected to the side pieces 10, 11, 12, and 13 in any preferred manner, such as the flanged arrangement indicated at 15.

One side of the bottle A, which is preferably of glass, is formed with a depression shown at 16. This depression may take any desired shape, although in the present instance it is shown as being substantially rectangular, and as formed on one side of the lower portion of the bottle. Obviously, the particular location of the depression is also susceptible of variation.

Figure 2:
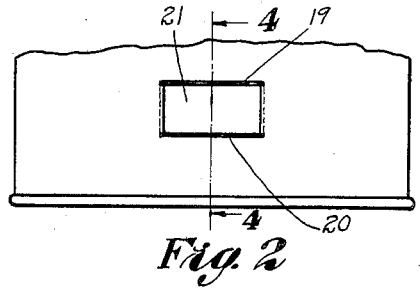
Figure 2 is a fragmentary view, somewhat similar to Figure 1, of a slightly modified form of bottle holder.
Figure 3:
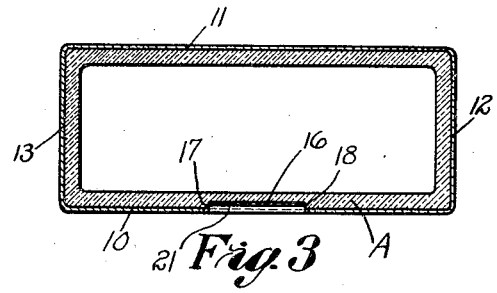
Figure 3 is a horizontal section taken about on the plane represented by the line 3—3 of Figure 1.
Figure 4:
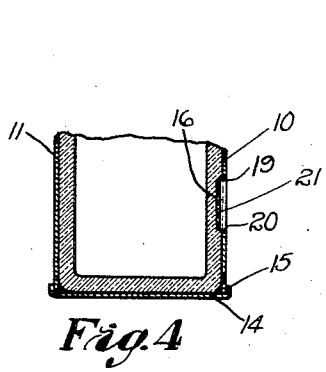
Figure 4 is a vertical section taken about on the plane represented by the line 4—4 of Figure 2.
Figure 5:
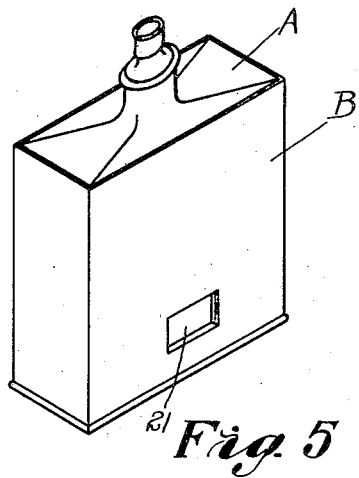
Figure 5 is a perspective view, bringing out a bottle and casing assembled in accordance with this invention.

One side of the casing B, such as the side 10, is slit to provide the vertically extending slits, shown at 17 and 18 in Figures 1 and 3. In a slightly modified arrangement, the slits may be horizontally disposed, such as is brought out in Figures 2 and 4, and wherein the slits are designated by the numerals 19 and 20. The metal between the slits may be readily deformed, or pressed inwardly, so as to provide a projecting portion 21 which enters the depression 16 to set up an interlock between the bottle A and the casing B.

In assembling the bottle and casing described above, the slits are first formed in a casing B, after which the bottle A is inserted through the open top thereof to the point where the bottom of the bottle engages the bottom 14 of the casing, and the depression 16 is aligned with the portion of the casing B between the slits, so that the portion 21 is susceptible to deformation into the depression. This metal deforming operation is then carried out to provide the projection 21, which is received in the depression 16, to permanently anchor the bottle A in the casing B.

It will be seen that the casing effectively protects the bottle against damage or breakage should the bottle be dropped or knocked against other objects. My improvements find particular application in the protection of bottles containing toilet preparations, such as face lotions, as such articles are frequently carried around by travelers under conditions where the bottle is likely to be subjected to abuses. The cost of the casing is relatively slight, and the expense of applying it is practically negligible; therefore, the combination can be provided at but very little additional price over what the bottle itself costs.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claim is intended to cover all of the generic and specific features of the invention herein described and all statements of the scope of the invention which, as a matter of language, might be said to fall therebetween.

What is claimed is:

In combination, a metallic casing having a flat side and a bottom, a bottle corresponding in shape to the casing and snugly received therein, the bottom of the bottle engaging the bottom of the casing, the bottle being formed with a substantially rectangular depression on the lower portion of the flat side thereof corresponding with the flat side of the casing, the metal of the casing being slit along lines homologous to two opposite parallel sides of the depression in the bottle, and a projection of the casing constituting the metal between the slits fitted in the depression of the bottle to set up an interlock between the bottle and the casing.

PHILIP K. WILLIAMS.